US011190492B2

(12) United States Patent
Lapidous et al.

(10) Patent No.: US 11,190,492 B2
(45) Date of Patent: Nov. 30, 2021

(54) LOCAL INTERCEPTION OF TRAFFIC TO A REMOTE FORWARD PROXY

(71) Applicant: AnchorFree Inc., Redwood City, CA (US)

(72) Inventors: Eugene Lapidous, Saratoga, CA (US); Sean Ghiocel, San Jose, CA (US); Maxim Molchanov, Mountain View, CA (US); Eduardo Panisset, San Jose, CA (US)

(73) Assignee: Twingate, Inc., Redwood City, CA (US)

( * ) Notice: Subject to any disclaimer, the term of this patent is extended or adjusted under 35 U.S.C. 154(b) by 435 days.

(21) Appl. No.: 16/058,511

(22) Filed: Aug. 8, 2018

(65) Prior Publication Data

US 2019/0173848 A1 Jun. 6, 2019

Related U.S. Application Data

(60) Provisional application No. 62/593,719, filed on Dec. 1, 2017, provisional application No. 62/618,397, filed on Jan. 17, 2018.

(51) Int. Cl.
*H04L 29/06* (2006.01)
*H04L 29/08* (2006.01)
(Continued)

(52) U.S. Cl.
CPC .......... *H04L 63/0281* (2013.01); *G06F 9/545* (2013.01); *H04L 12/4633* (2013.01);
(Continued)

(58) Field of Classification Search
CPC ... H04L 63/029; H04L 63/30; H04L 67/2819; H04L 63/0428; H04L 45/74; H04L 69/22;
(Continued)

(56) References Cited

U.S. PATENT DOCUMENTS

| 6,591,306 B1 * | 7/2003 | Redlich ............. H04L 29/12018 370/401 |
| 7,539,179 B1 | 5/2009 | Baird |
| 8,291,116 B2 | 10/2012 | Read |
| 8,483,133 B2 | 7/2013 | Navratil |

(Continued)

FOREIGN PATENT DOCUMENTS

WO   WO2000011849   3/2000

OTHER PUBLICATIONS

Van de Erve "Creating a Forward Proxy Using Application Request Routing" Jun. 10, 2014.

*Primary Examiner* — Huan V Doan
(74) *Attorney, Agent, or Firm* — David R. Stevens; Stevens Law Group

(57) ABSTRACT

An application using a VPN is programmed to transmit proxy traffic to a remote proxy server. Traffic to the proxy server is intercepted, shifted to user space, and processed according to one or more options. Traffic may be terminated by a local proxy that resolves domain names in traffic and requests referenced content. Intercepted traffic may include plain text data in headers that is encrypted before forwarding to a different proxy server. Traffic may be evaluated, such as a User Agent string in order to determine routing choices, such as blocking, throttling, local termination, transmitting through a VPN, or other options. Multiple VPNs may operate on the same user computer and proxy traffic may be intercepted and processed by transmitting it through a VPN, bypassing all VPNs, or routing through a different VPN.

30 Claims, 9 Drawing Sheets

(51) Int. Cl.
*H04L 12/46* (2006.01)
*H04L 29/12* (2006.01)
*G06F 9/54* (2006.01)
*H04L 12/741* (2013.01)

(52) U.S. Cl.
CPC .......... *H04L 12/4641* (2013.01); *H04L 45/74* (2013.01); *H04L 61/1511* (2013.01); *H04L 63/029* (2013.01); *H04L 63/0272* (2013.01); *H04L 63/0428* (2013.01); *H04L 63/164* (2013.01); *H04L 63/30* (2013.01); *H04L 67/28* (2013.01); *H04L 67/2819* (2013.01); *H04L 69/22* (2013.01); *H04L 61/6009* (2013.01)

(58) Field of Classification Search
CPC . H04L 63/0272; H04L 67/28; H04L 61/1511; H04L 12/4641; H04L 61/6009; H04L 63/0281; G06F 9/545
See application file for complete search history.

(56) References Cited

U.S. PATENT DOCUMENTS

| | | | |
|---|---|---|---|
| 8,495,181 B2 | 7/2013 | Venkatraman | |
| 8,886,750 B1* | 11/2014 | Mutz | H04L 61/1511 |
| | | | 709/217 |
| 9,755,919 B2 | 9/2017 | Kersch | |
| 2002/0110084 A1 | 8/2002 | Butt | |
| 2005/0246519 A1* | 11/2005 | Ackerman | H04L 63/0823 |
| | | | 713/100 |
| 2010/0318665 A1* | 12/2010 | Demmer | H04L 69/163 |
| | | | 709/227 |
| 2011/0154477 A1 | 6/2011 | Parla | |
| 2012/0117239 A1* | 5/2012 | Holloway | H04L 63/0884 |
| | | | 709/226 |
| 2013/0298201 A1* | 11/2013 | Aravindakshan | H04L 63/0272 |
| | | | 726/4 |
| 2014/0229615 A1* | 8/2014 | Hsueh | H04L 69/22 |
| | | | 709/224 |
| 2015/0058488 A1* | 2/2015 | Backholm | H04L 47/286 |
| | | | 709/226 |
| 2015/0139041 A1 | 5/2015 | Bosch et al. | |
| 2016/0218978 A1 | 7/2016 | Lapidous et al. | |
| 2016/0337104 A1* | 11/2016 | Kalligudd | H04L 5/0053 |

* cited by examiner

LOCAL INTERCEPTION OF TRAFFIC TO A REMOTE FORWARD PROXY

RELATED APPLICATIONS

This application claims the benefit of U.S. Provisional Application Ser. No. 62/593,719 filed Dec. 1, 2017 and U.S. Provisional Application Ser. No. 62/618,397 filed Jan. 17, 2018, both entitled "Local interception of remote forward proxy," which are hereby incorporated herein by reference in their entirety for all purposes.

FIELD OF THE INVENTION

The present invention relates generally to systems and methods for implementing proxy connections.

BACKGROUND OF THE INVENTION

Rapid expansion of the data traffic over the computer networks requires increased support for the rule-based traffic processing. Enterprises may set per-user permissions for access to selected resources; end-users may want to access selected resources through intermediary servers to preserve their privacy by hiding source IP address; traffic for selected applications, such as voice-over-IP, should be delivered with lowest available latency, while traffic for other applications could be delayed or throttled.

Rule-based traffic processing is often implemented by deploying a proxy server: a computer system or application that acts as an intermediary for requests from clients seeking resources from other servers. One type of the proxy server is a forward proxy. The forward proxy may be on a different computer from a client (a remote forward proxy) or on the same computer as the client (a local forward proxy).

It would be an advancement in the art to provide an improved implementation of a forward proxy, particularly a local forward proxy.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
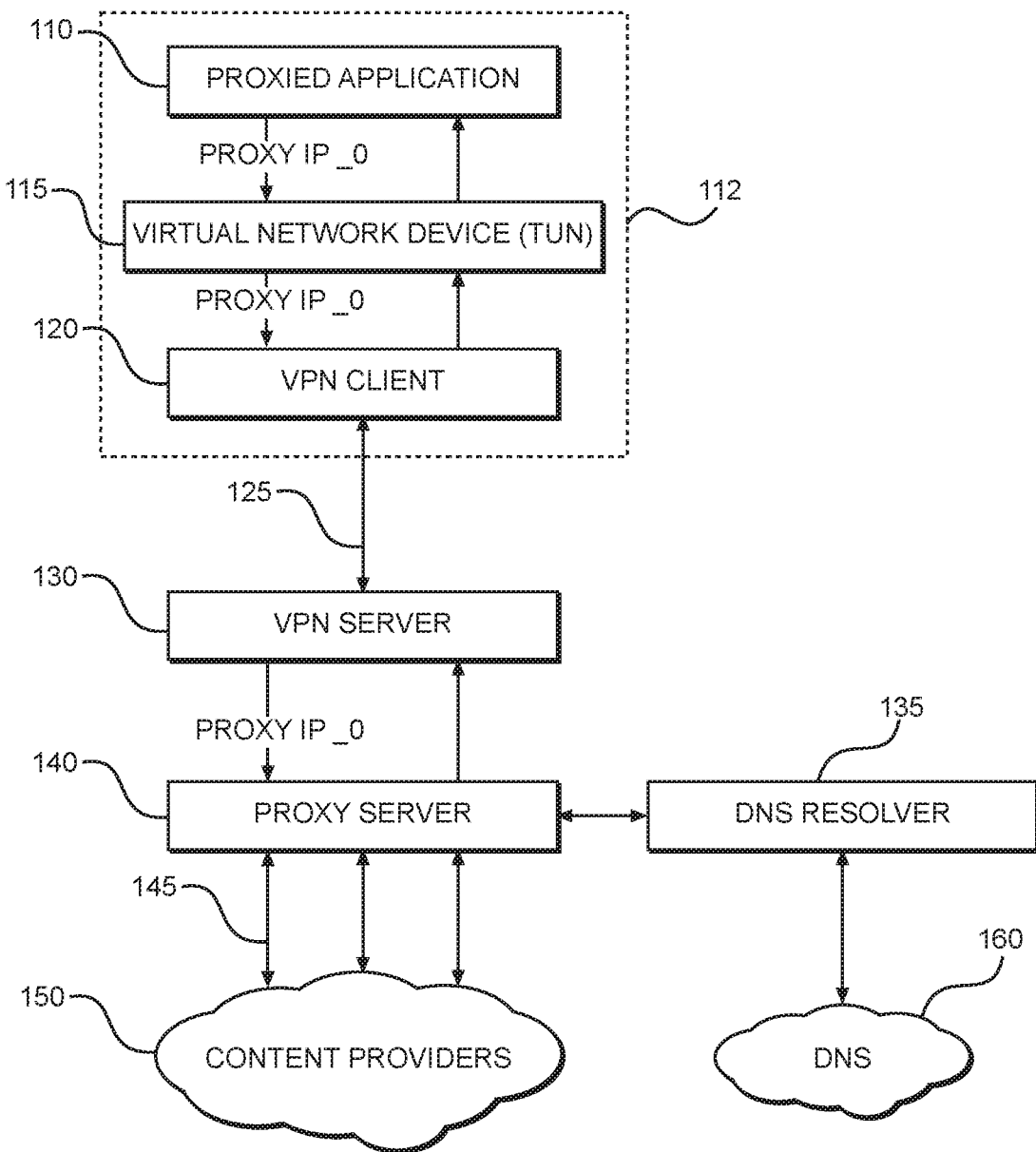
FIG. 1 is a schematic block diagram of a prior art network environment for routing traffic through remote forward proxy associated with a VPN.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A typical forward proxy requires explicit client configuration. For instance, one or more application on the user's computer can be provided with the network identifier of the proxy server, such as an IP address or domain name and a destination port.

A forward proxy server located on a computer different from the user's computer, for instance, at the address outside of the local network, is known as a remote forward proxy. It can be used to hide a user's IP address, control the routing path between the user's computer and the content servers, suppress DNS requests from the user's computer, and to block or throttle selected traffic before it reaches user's computer. However, forwarding user's traffic through a remote proxy may increase the access latency due to the increased number of routing hops and additional buffering.

An application configured to use a remote forward proxy, such as a Web Browser, usually sends one or more headers, such as headers including a domain name of the content server, in a plain text, even when the body of the request is encrypted using HTTPS protocol. This may affect user privacy, exposing browsing history to an external observer.

A forward proxy server located on the user's computer is known as a local forward proxy. It could be used to analyze, filter or throttle the user traffic without noticeably increasing the access latency. However, the local proxy can't hide the user's IP address or prevent DNS requests from being issued from the user's computer. In some operating systems, such as the iOS™ operating system developed by the Apple Inc., the local forward proxy is terminated within a few minutes after becoming a background process. If the local proxy is specified as part of the settings for a Virtual Private network (VPN), terminating it may cause the device to lose an ability to exchange traffic over the computer network.

Known solutions, such as a Proxy Auto Configuration (PAC) file, enable fall back to a direct connection or switching to another proxy if a first proxy isn't responding. However, such fallback causes additional delay for every user request sent to an invalid or non-existing proxy. The PAC file may also support selecting a forward proxy based on a host name or Universal Resource Locator (URL) of the request, but doesn't allow one to select the routing option based on other informative parameters, such as a process issuing the request.

Request-based routing options are further decreased when a VPN is used. For instance, there is no known solution for automatic request-based switching between multiple VPNs with different proxy settings.

Accordingly, there is a need to:
Combine the advantages of the local and remote forward proxies, such as local traffic filtering but without the risk of terminating the background proxy process.
Protect user privacy when using a remote forward proxy
Improve performance and flexibility of request-dependent selection of proxy routing options.
Enable request-dependent selection of different VPNs associated with different proxy settings.

FIG. 1 illustrates prior art network environment for routing traffic through a remote forward proxy associated with a VPN. In this environment, VPN settings contain an IP address of the remote forward proxy (IP_0). When the VPN is enabled, an application 110 on the user's computer 112 sends all its traffic to the IP address IP_0, using the CONNECT method. This traffic is captured by a Virtual Network Device (TUN) 115 and shifted to user space, where it is encapsulated into a secure VPN tunnel 125 by a VPN client 120 and sent over a computer network to a VPN server 130. VPN server 130 terminates the VPN tunnel 125 and sends the traffic to a remote forward proxy server 140, which asks a DNS resolver 135 to resolve a domain name provided to a remote proxy in the CONNECT header for each content request. The DNS resolver 135 forwards the request to the DNS server 160 and caches the response. The proxy server 140 receives the response from the DNS server 160 and uses an IP address in the response to establish a connection 145 with each content provider 150. The proxy server 140 receives a response from the content provider 150 and forwards the response through the VPN tunnel to the proxied application 110. Note that any proxy server, local or remote, described in any of the embodiments disclosed herein may perform DNS resolution in order to determine the IP address of a content provider referenced in a content request included in traffic routed to the proxy server.

Figure 2:
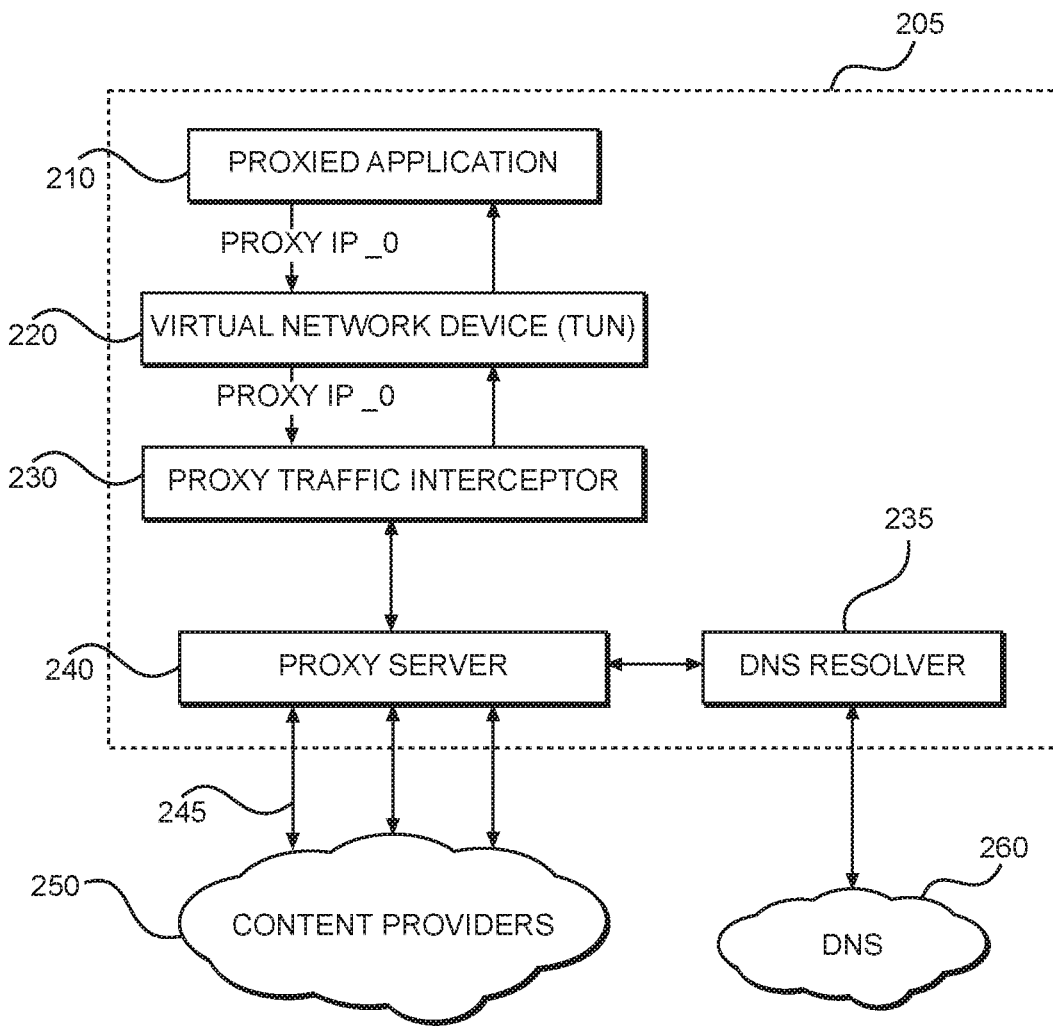
FIG. 2 is a schematic block diagram of a network environment for locally intercepting the traffic intended for a remote proxy associated with a VPN, according to an embodiment of the present invention.

FIG. 2 illustrates a network environment for locally intercepting the traffic intended for a remote proxy associated with a VPN according to an embodiment of the present invention. In this embodiment, VPN settings also contain the IP address of the remote forward proxy (proxy IP_0). Proxy traffic to IP_0 is generated by an application 201 on the user's computer 205 and shifted to the user space by a virtual network device 220. For example, the application 201 may generate a content request addressed to the remote forward proxy (e.g., IP address IP_0) that is shifted from kernel space to the user space by the virtual network device 220. In other embodiments disclosed herein, a shift to user space shall be understood to include a shift from kernel space to user space. Likewise, subsequent processing of traffic shifted to user space shall be understood to also be performed in user space. Likewise, the modules that perform subsequent processing of traffic after it is shifted to user space shall also be understood to be executing in the user space.

In contrast to the approach shown in FIG. 1, the content request is intercepted by a proxy traffic interceptor 230 and terminated by a local proxy server 240 without being sent through a VPN tunnel or forwarded to the remote proxy referenced by IP_0. The proxy traffic interceptor 230 may operate in the user space. Instead, the local proxy 240 transmits a resolution request to a local DNS resolver 235, the resolution request including the domain name that would have been provided to the remote proxy in the CONNECT header of the content request. The local DNS resolver 235 forwards the resolution request to a DNS server 260 and caches a response to the resolution request received from the DNS server 260.

The local proxy server 240 accesses the response to the resolution request, which includes an address (e.g., an IP address) for a content provider 250 referenced by the domain name in the content request. After that, the local proxy server 240 establishes a connection 245 with the content provider 250, the local proxy server 240 requests content referenced by the content request, receives the requested content, and provides the requested content to the proxied application 210. This process may be repeated for any number of content requests from any number of content providers.

In the embodiment of FIG. 2, a content request to the content provider specified in the CONNECT header may be sent without forwarding it to the remote forward proxy identifier (e.g., IP_0) specified in the VPN settings. In some embodiments, such a remote proxy identifier may correspond to an IP address not associated with any remote proxy server, or with any computer in a computer network: it is only used by the proxy traffic interceptor 230 to identify traffic to be intercepted and terminated by the local proxy server 240. For example, the remote proxy identifier (e.g., IP_0) may be associated with a non-routable IP address from a range different from the local network of the user's computer 205. In some embodiments, the remote proxy identifier is associated with a reserved IP address, such as one from the range 240.0.0.0/4, which is reserved for future use, or with a test IP address, such as one from the range 203.0.113.0/24, which is assigned for documentation and examples but should not be used publicly. Accordingly, the proxy traffic interceptor 230 may be programmed to intercept content requests including this IP address for processing as described above using the proxy server 240 and DNS resolver 235.

The embodiment of FIG. 2 provides the functionality of a local proxy without creating a separate application that could be terminated after moving to background operation. An operating system, such as iOS™, may therefore continue to send traffic through a VPN extension, which in turn terminates the traffic on the local proxy 240 instead of sending it through a VPN server or a remote proxy. This, for instance, enables the ability to filter or throttle the traffic on the mobile device for real-time malware detection or bandwidth control without the need for root access to the operating system of the mobile device.

In some embodiments, the DNS resolver 235 may be configured to use a DNS server 260 with an IP address different from an address of a DNS server known to one or more applications 210 on the user's computer 205. For example, a response to the DNS request issued by DNS resolver 235 may be stored on the user's computer without updating a DNS cache used by one or more applications 210 on the user's computer. In this way, the local proxy server 240 is enabled to change the DNS server transparently, without being noticed by the client applications 210. This could be utilized, for instance, to enforce DNSSEC (Domain Name System Security Extensions) protocol, thereby preventing interception and modification of the DNS traffic by third parties.

In some embodiments, remote proxy settings could be specified without integrating them into the VPN settings. For example, a remote proxy could be specified as a system proxy or as an application-specific proxy (for instance, a proxy for a web browser). In another example, a remote proxy may be specified as part of the Wireless Network (WiFi) settings for the user computing device 205.

In some embodiments, remote proxy traffic may be intercepted without using the virtual network device 220. For instance, this may instead be implemented by using Windows Filtering Platform (WFP), provided by Microsoft Corporation for its Windows™ operating system.

In some embodiments, remote proxy traffic could be detected for interception by its network identifier, such as a destination IP address (initially specified or resolved from a proxy domain) or by the destination port. In some embodiments, remote proxy traffic can be detected for interception by one or more other patterns, for instance, by the presence of at least one of the CONNECT or HOST headers.

Figure 3:
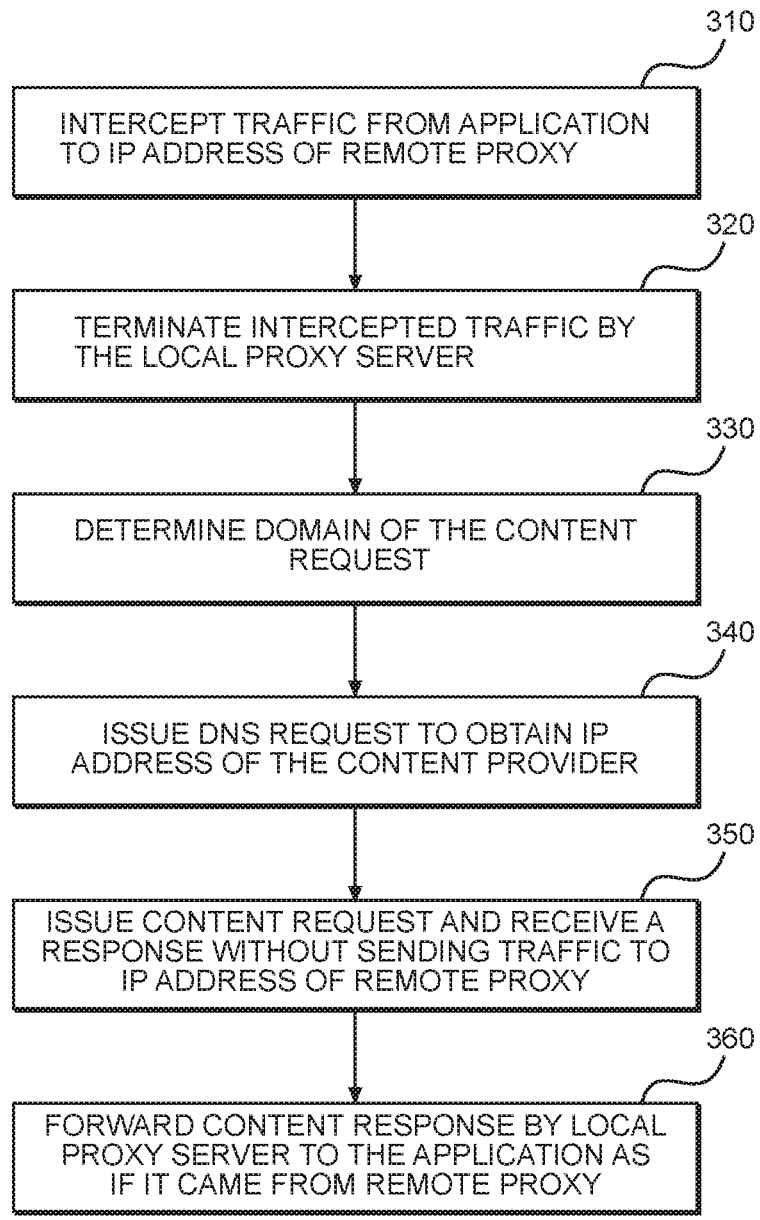
FIG. 3 is a process flow diagram of a method for locally intercepting the traffic intended for a remote proxy associated with a VPN according to an embodiment of the present invention.

FIG. 3 illustrates a method 300 for locally intercepting the traffic intended for remote proxy associated with VPN according to an embodiment of the present invention. The method 300 may be executed using the network environment of FIG. 2. Traffic from application 210 addressed to the IP address of a remote proxy is intercepted 310, and then terminated 320 by the local proxy server 240. A domain included in the content request is extracted 330 from the proxy header and resolved 340 to obtain an IP address of a content provider. Resolving may include the use of a local DNS resolver 235 as described above with respect to FIG. 2. After obtaining the IP address of the content provider, a request to the IP address is issued 350 by the local proxy server and a response is received 360 without sending the traffic addressed to the remote proxy to the IP address of the remote proxy. The response is then provided to the application 210 that generated the traffic, such as through the proxy traffic interceptor 230 and virtual network device 220.

This process flow is applicable to multiple implementations, with or without a VPN. The illustrated method enables use of the local proxy 240 while the applications and the operating system operate in the same way as if traffic were processed by a remote proxy. In particular, the applications and operating system do not require modification in order to operate in cooperation with the local proxy 240.

Figure 4:
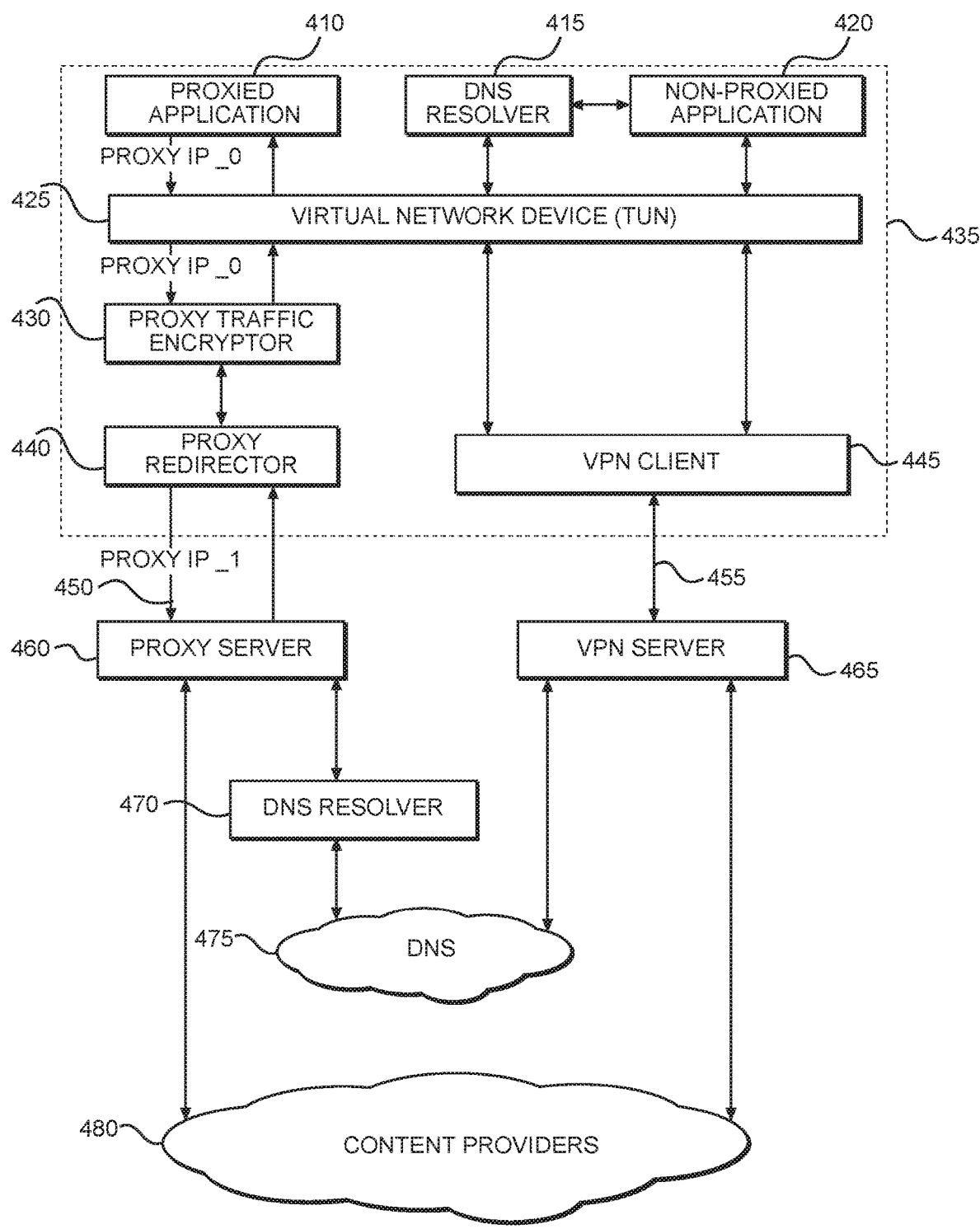
FIG. 4 is a schematic block diagram of a network environment for redirecting the traffic intended for a remote proxy associated with a VPN to a different remote proxy according to an embodiment of the present invention.

FIG. 4 illustrates a network environment for redirecting the traffic intended for remote proxy associated with a VPN to a different remote proxy according to an embodiment of the present invention. In this embodiment, VPN settings specify a remote proxy at a destination associated with an address IP_0. Proxy traffic to IP_0 is generated by application 401 on the user's computer 435 and shifted to the user space by a virtual network device 425. The proxy traffic is then processed in user space by a proxy traffic encryptor 430.

In some embodiments, encryptor 430 encrypts at least a portion of the proxy traffic that was sent by the application 410 as plain text, such as the CONNECT, HOST or User Agent header, thereby protecting privacy of the user's traffic. A proxy redirector 440 receives the at least partially encrypted proxy traffic ("the encrypted proxy traffic") from the encryptor 430 and changes a destination of the encrypted proxy traffic: instead of being sent to IP address IP_0, the encrypted proxy traffic is sent to a remote proxy server 460 at a different address IP_1. The proxy server 460 receives the encrypted proxy traffic and decrypts the encrypted portion. The proxy server 460 may then interact with a DNS resolver 470 and a DNS server 475 to obtain an IP address of a content provider 480 for a domain name included in the encrypted proxy traffic. The proxy server 460 may also send a content request to the IP address of the content provider 480 requesting content referenced in the encrypted proxy traffic, e.g., a web page or media file referenced by a URL. The proxy server 460 receives the content from the content provider 480 and returns the requested content to the user's computer 435.

In some embodiments, encryption of at least part of the proxy traffic is accompanied by changing the communication protocol used to exchange the encrypted proxy traffic with the remote proxy server 460. For instance, such protocol can be changed to the Hyper Text Transport Protocol version 2.0 (HTTP 2.0) without notification to the operation system or the application 410 that generated the proxy traffic and without requiring the operating system or application 410 to be modified to implement the protocol change. For example, this protocol change can be implemented by the encryptor 430. In another example, proxy traffic encryptor 430 and proxy redirector 440 can be combined into a single module, responsible for both protocol change and traffic redirection.

In the described embodiment, proxy traffic is sent to an IP address different from the one known to the proxied application 410 (IP_0!=IP_1) without notification to the operating system or the proxied application 410 and without requiring modification of the operating system or proxied application 410 to implement the change in address. In some embodiments, no traffic is sent to the network identifier (IP_0) which the proxied application 410 is programmed to use. For example, this identifier may not be associated with any proxy server or any computer available on the local network. In addition to making it easier to dynamically change the proxy IP address, this also simplifies detection of the proxy traffic: proxy settings may use the same pre-defined IP address that is provided to proxy traffic encryptor 430, proxy redirector 440, or other module programmed to intercept traffic, which will then intercept traffic including the pre-defined IP address for processing as described above.

In some embodiments, the proxy IP address is specified in VPN settings and at least some traffic is sent from a VPN client 445 through a secure tunnel 455 to a VPN server 465 and then to one of the content providers 480 without being forwarded through a remote proxy referenced by the proxy IP address. Such traffic can be generated by a non-proxied application that ignores system proxy settings, for instance, by a Voice Over IP (VoIP) application that uses Unified Datagram Protocol (UDP), or by a web browser configured to ignore system proxy settings.

In some embodiments, a non-proxied application 420 uses a DNS resolver 415 executing on the same computer 435 and that sends DNS requests through the VPN client 445 and a tunnel 455 to a DNS server, which may be the same as or different from the DNS server 475 used by the proxy server 460. In such embodiments, only non-proxied traffic from the user's computer includes DNS requests whereas no DNS requests are issued from the user's computer 435 for the proxied traffic. Instead, domain names are resolved by the proxy server 460 for the proxied traffic.

In some embodiments, both the proxy server 460 and the VPN server 465 are located on the same computer, different from the user's computer 435. For example, both the proxy server 460 and the VPN server 465 are associated with the same IP address. In another implementation, the proxy server 460 and the VPN sever 465 are located on different computers: for instance, proxy server 460 may be located nearer to the HTTP content providers 480 than the VPN server 465 while the VPN server 465 may be located nearer to a VoIP server or relay than the proxy server 460.

Figure 5:
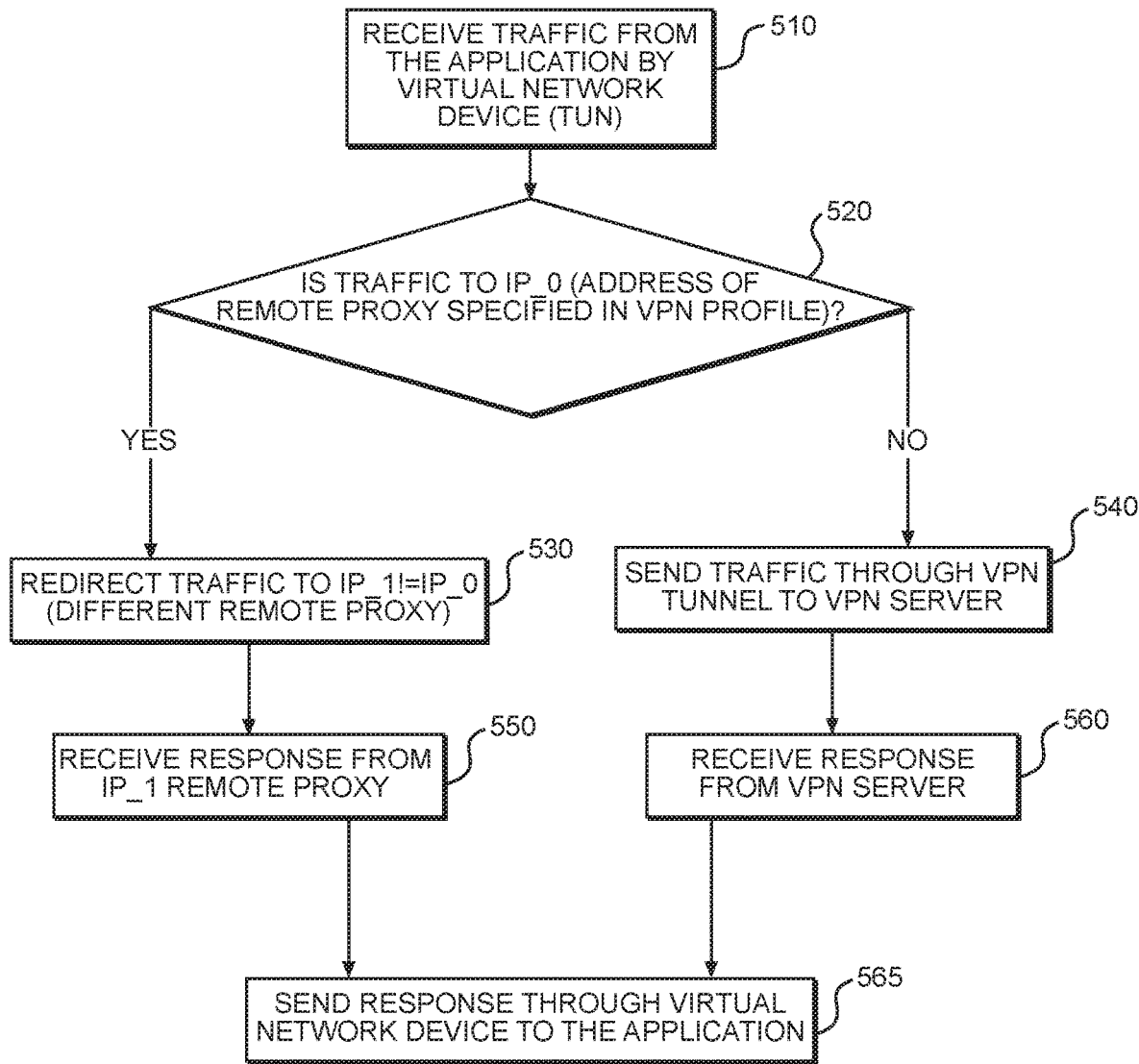
FIG. 5 is a process flow diagram of a method for redirecting the traffic intended for a remote proxy associated with a VPN to a different remote proxy according to an embodiment of the present invention.

FIG. 5 illustrates a method 500 for redirecting the traffic intended for a remote proxy associated with a VPN to a different remote proxy according to an embodiment of the present invention. The method 500 may be executed using the network environment of FIG. 4. Traffic from one or more applications 410 on the user's computer 435 is shifted 510 to the user space by the virtual network device 425 and then analyzed 520 to determine whether the traffic is directed to a proxy specified in the VPN profile. If yes, the traffic is redirected 530 to a different remote proxy 460. Redirecting 530 may include at least partially encrypting the traffic as discussed above with respect to FIG. 4.

Upon receiving 550 a response from the remote proxy 460, the response is sent 565 back to the requesting application 410. If received traffic is not identified 520 as a proxy traffic, the traffic is sent 540 through the VPN tunnel 455 to the VPN server 465, and, upon receiving 560 a response from the VPN server 465, this response is also sent 565 back to the requesting application 410.

In some embodiments, both redirected proxy traffic and non-proxy traffic are sent through the secure VPN tunnel 455. In this case, encryption of the plain text proxy traffic may be done by the VPN client 445, and proxy protocol may remain unchanged.

Some or all of the above-described embodiments enable use of different remote forward proxy servers in a manner that is transparent to the applications and the operating system, which are programmed to transmit the traffic to a remote proxy specified in VPN settings, Wi-Fi settings, system proxy settings or any other proxy settings known to the applications or the operating system.

Figure 6:
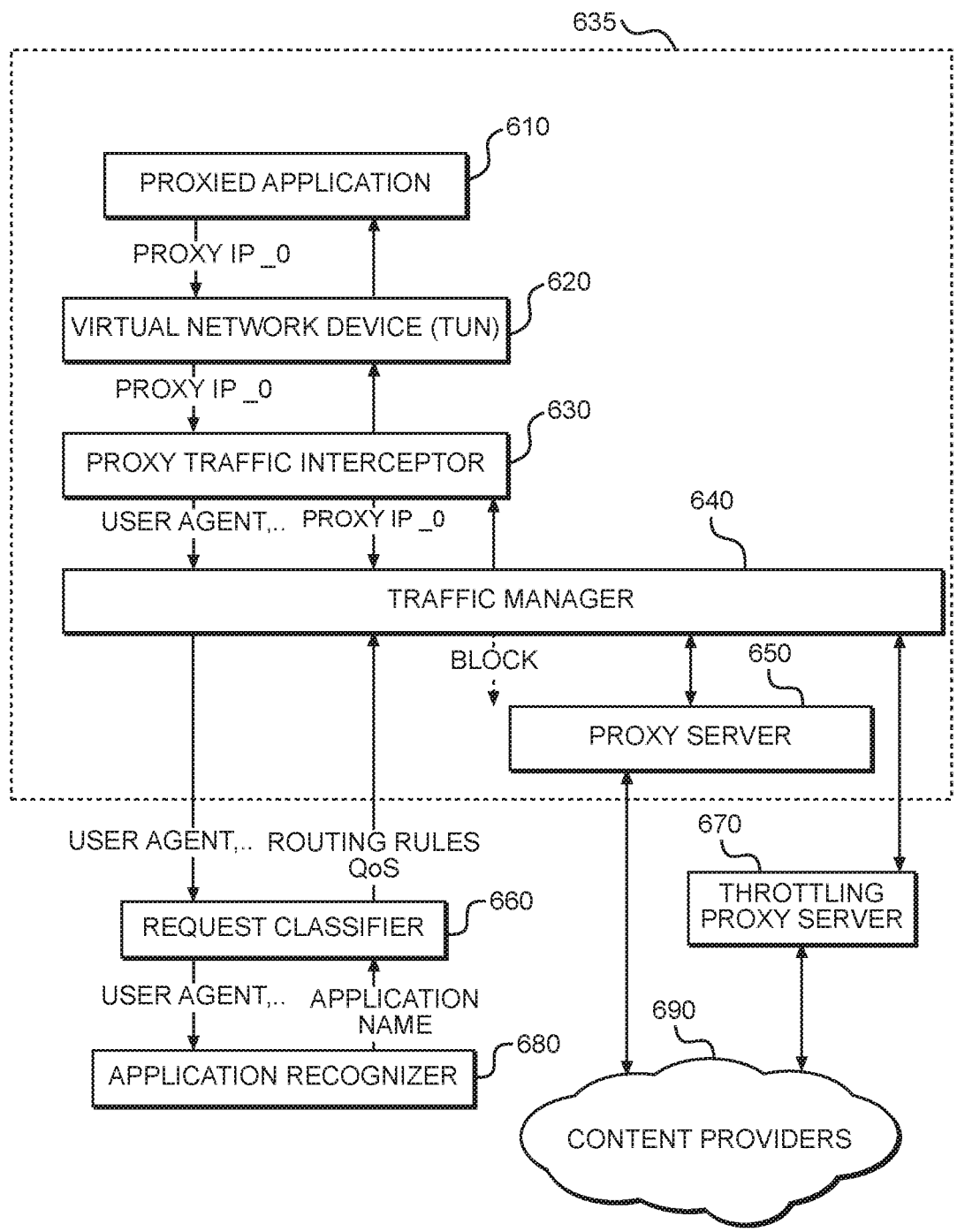
FIG. 6 is a schematic block diagram of a network environment for dynamically selecting one of the different processing choices for the traffic intended for a remote proxy according to an embodiment of the present invention.

FIG. 6 illustrates a network environment for dynamically selecting one of a plurality of different processing choices for the traffic intended for a remote proxy according to an embodiment of the present invention. In the illustrated embodiment, one or more applications 610 on the user's computer 635 are instructed to send their traffic through a proxy server associated with a specific network identifier, such as IP address IP_0. This instruction may be received in the form of VPN settings read by or otherwise input to the applications 610.

Some or all of the applications 610 may use Hyper Text Transport Protocol (HTTP) or HTTP Secure (HTTPS), which may include sending plaintext headers including one or both of a requested domain name of a content server and a User Agent string supplied by the requesting application 610, together with a payload that includes a content request.

In some embodiments, the proxy settings are specified as part of the VPN settings on the computer 635. Application traffic directed to a remote proxy server (e.g., addressed to IP_0) is shifted to user space by the virtual network device 620 and intercepted by the proxy traffic interceptor 630. Intercepted traffic is sent to a traffic manager 640, which selects one of the multiple processing choices for the traffic.

FIG. 6 illustrates a case where the proxy traffic interceptor 630 extracts contents of the User Agent string and separately sends them to the traffic manager 640 to help it select a processing choice. In other implementations, the traffic manager 640 can be combined with the proxy traffic interceptor 630 or perform such extraction by itself. The common feature of these implementations is that content of the User Agent string is used to decide which processing choice to select for the current content request. Other information in traffic may additionally or alternatively be used to select a processing choice, such as a requested URL, or any other field in a header of a packet within the traffic.

In some embodiments, one of these processing choices includes terminating a proxy connection by a local proxy server 650, instead of sending proxy traffic to the external IP address IP_0. The local proxy server 650 may communicate directly with the content provider 690 to retrieve content requested by the proxy traffic without sending any traffic to IP_0. The content provider 690 returns the content to the computer 635. The traffic manager 640 than returns the content to the proxied application 610 that generated the proxy traffic, such as through the virtual network device 620.

In some embodiments, another processing choice may include throttling a selected request in the proxy traffic by forwarding it to a remote proxy server, such as a throttling proxy server 670. For instance, the throttling proxy server 670 could be used to throttle video traffic from a content provider 690 in order to decrease consumed bandwidth (a content provider 690 implementing a video server using HLS or MPEG-DASH protocol will automatically decrease resolution upon detecting low bandwidth). In this example, proxy server 670 may be associated with an IP address different from the one the application 610 is instructed to use (IP_0). In another example, proxy server 670 could be associated with the IP address IP_0, already provided to the application 610 to identify a specified remote proxy server. A common feature of both examples is that the decision to forward traffic to the remote proxy server 670 is made by analyzing the content of the User Agent string, such as by the traffic manager 640.

In some embodiments, another processing choice includes blocking a content request included in the proxy traffic without sending it to either a content provider 690 or any proxy server. Such blocking can be accomplished, for instance, by instructing local proxy 650 to terminate the request without establishing a connection with the content provider 690 referenced by the request. For example, the content request can be blocked because it presents privacy or security risk as determined according to one or more pre-determined rules provided to the traffic manager 640. In some embodiments, the content of the User Agent string helps to detect such malicious request by recognizing that it was issued by a known malicious application or by a module having an independent user agent, such as a third party Software Development Kit (SDK).

Other processing choices may include sending some requests through a VPN tunnel to an external VPN server, with or without forwarding them to a remote proxy, such as the throttling proxy 670 or some other remote proxy.

In some embodiments, the traffic manager's 640 analysis of the User Agent string includes sending at least part of the User Agent string to an external classification service, such as the request classifier 660. In the illustrated embodiment, the request classifier 660 sends at least a part of an unknown User Agent string to the an application recognizer 680. An unknown User Agent string may be one that does not match a pattern specified in a rule accessible locally to the traffic manager 640. The application recognizer 680 may identify an application referenced by the unknown User Agent string by using the at least the part of the User Agent string, such as by applying rules that associate patterns within User Agent strings to classifications (benign, malicious, etc.). The application recognizer may also receive and evaluate contents of one or more other headers present in the original proxy traffic including the unknown User Agent string, for instance, a domain name present in at least one of the CONNECT, SNI and HOST headers. The application recognizer 680 may then classify the User Agent as benign or malicious and return this determination to the traffic manager 640, such as by way of the request classifier 660. The request classifier may store this determination for the at least the portion of the User Agent string and use this determination in response to other classification requests matching the at least the portion of the User Agent string.

In some embodiments, the traffic manager 640 or the request classifier may determine the processing choice by taking into account one or more previously intercepted content requests associated with one or more different user agents or applications. In some embodiments, the content request associated with an application or user agent can be blocked if one or more previously intercepted content requests are associated with applications or user agents from a pre-defined list. For instance, the traffic manager 640 may block all traffic from other applications while a high-priority application remains active. Such high-priority application could be, for instance, a banking application, or an e-commerce application where the user performs a payment transaction. Blocking background applications could be used to improve the user's privacy and security (by preventing side-channel traffic analysis) and to increase the application's performance (by blocking low-priority traffic).

Figure 7:
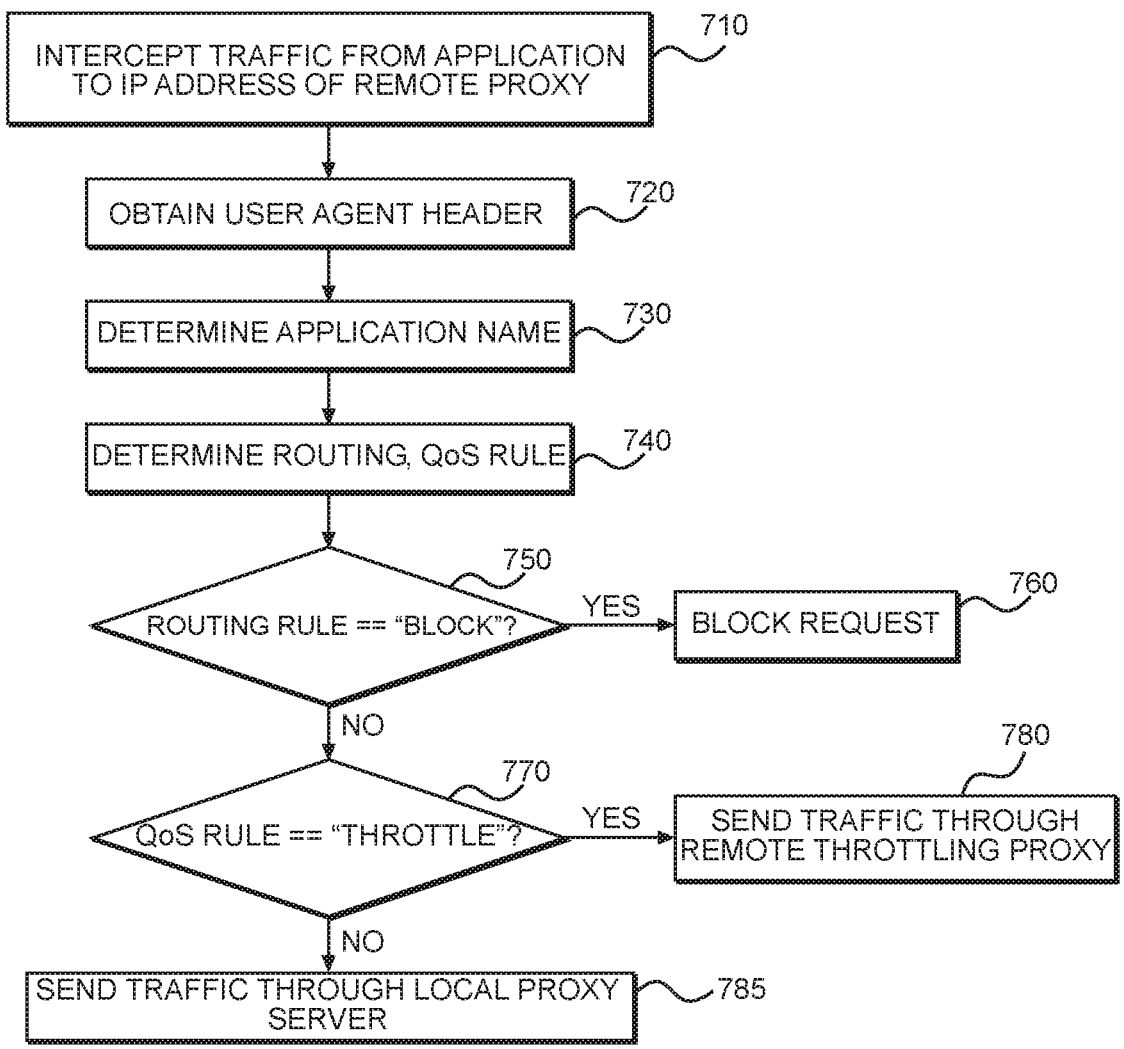
FIG. 7 is a process flow diagram of a method for dynamically selecting one of the different processing choices for the traffic intended for a remote proxy according to an embodiment of the present invention.

FIG. 7 illustrates a method 700 for dynamically selecting a one of the different processing choices for the traffic intended for remote proxy according to an embodiment of the present invention. The method 700 may be executed using the network environment of FIG. 6. Traffic sent from an application to the IP address of a remote proxy is intercepted 710 and analyzed to obtain 720 the User Agent string in the traffic, such as by using contents of the User Agent header (in some implementations, together with other headers such as CONNECT, HOST or SNI headers) to determine 730 the application name for the application that generated the traffic. The application name (in some implementation, together with prior history of content requests) is used to determine 740 a processing choice, for instance, by applying a routing rule or Quality of Service (QoS) rule to the application's traffic. In some implementations, the processing choice may include a requirement to throttle specific traffic, or to send specific traffic using a specific protocol specified in one or more rules, for instance, in order to prevent its blocking by censors.

If the application name is found 750 to match a pattern of a rule requiring blocking, the traffic is blocked 760. The rule may be provide to the traffic manager 640 by an administrator or other source of rules for determining what traffic to block. Blocking may be performed using the local proxy server 650 as described above.

If the application name is found 770 to match a known pattern of a QoS rule requiring throttling, the traffic is sent 780 through a throttling proxy server 670 as described above.

In some embodiments, the default processing for traffic is sending 785 it to a content provider 690 addressed by the traffic through a local proxy server 650 as described above.

In some embodiments, one of the processing choices may be to update an amount of data consumed by the traffic associated with the application name determined at step 730. Accordingly, as the amount of data consumed reaches a threshold level, the processing for that application name may change, such as by beginning to throttle traffic for that application name or increasing an amount of throttling.

In some embodiments, one of the processing choices may include sending at least a portion of the traffic addressed to a remote proxy server, e.g. IP_0, through a VPN tunnel to a VPN server. This would therefore include encrypting the traffic, such as a content request, and sending the encrypted traffic over the VPN tunnel to the VPN server.

Note also that traffic received according to the environment of FIG. 6 and the method 700 of FIG. 7 may be partially encrypted as described above with respect to FIGS. 4 and 5. For example, payload data of a content request may be encrypted whereas other data is in plain text, such as a domain name of a content server, or one or more of the headers (CONNECT, HOST, SNI, User Agent string, or the like) are not encrypted. Accordingly, one of the processing choices may include encrypting the plain text data to obtain an encrypted request and sending the encrypted request to a remote proxy server in the manner described above with respect to FIGS. 4 and 5.

Multiple processing choices could be applied to the same request. For example, traffic may be both redirected through a remote proxy with different IP address from that included in the traffic, throttling its throughput, measuring the amount of consumed data.

As is apparent, one advantage of the described implementations is that forcing an application to use a remote proxy provides additional information that could be useful to select processing choice even if payload data in traffic from the application is encrypted by using HTTPS protocol. At the same time, the disclosed embodiments ensure that the presence of the proxy setting input to the application does not create additional latency or the need to send all traffic to the proxy address input to the application. This additional information, such as part or all of the User Agent or the application name derived from the User Agent, can be used to improve malware detection, application monitoring, quality of service and other factors affecting user experience.

Figure 8:
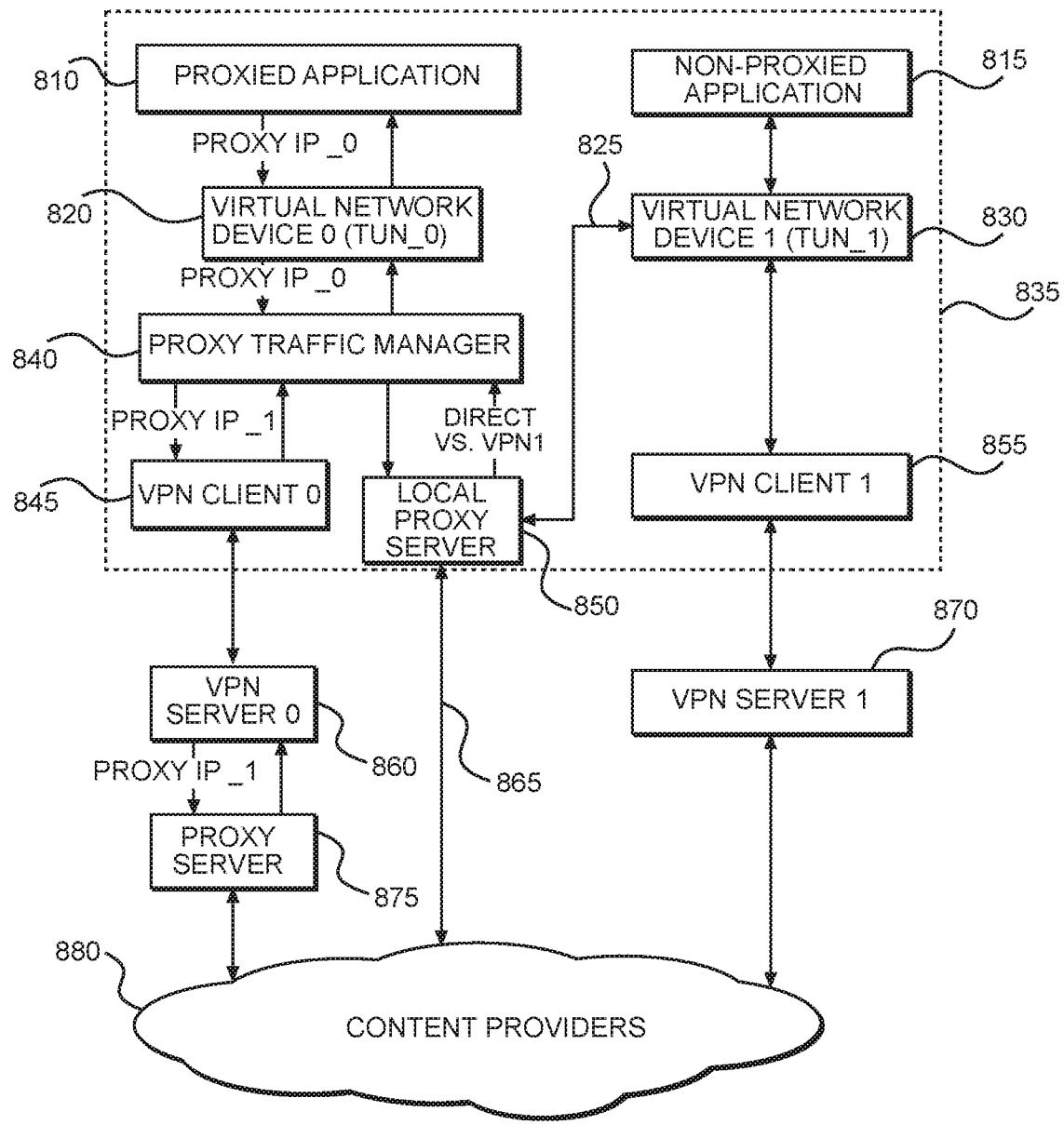
FIG. 8 is a schematic block diagram of a network environment for dynamically selecting a different VPN and proxy routing options for the traffic intended for a remote proxy associated with a VPN according to an embodiment of the present invention.

FIG. 8 illustrates a network environment for dynamically selecting a different VPN and proxy routing options for traffic intended for a remote proxy associated with a VPN according to an embodiment of the present invention. In this embodiment, at least two different VPNs are defined on the user computer. The settings for at least one of these VPNs may include a setting for a remote proxy associated with a network identifier. For instance, a domain name or IP address and a destination port of the remote proxy server. In some embodiments, at least two specified VPNs remain active at the same time, both VPNs being associated with different virtual network devices (VNDs) 820, 830. In addition to activating multiple VPNs, the operating system on the user's computer 835 may be requested to enable different routing for the VNDs of each VPN.

In the illustrated embodiment, a first VPN is associated with proxy IP address IP_0 and uses VND TUN_0 (820), while a second VPN is not associated with proxy settings and uses VND TUN_1 (830). Traffic addressed to IP_0 is routed to TUN_0, while traffic to all other IP addresses is routed to TUN_1. This can be accomplished, for example, by using "route" commands or "iproute2" commands to route IP_0 to utun0 (TUN_0), and to route 0.0.0.0 traffic to utun1 (TUN_1) (a more specific route take precedence when parsing the routing table).

In another implementation, more than one IP address can be routed to TUN_0, while the rest are routed to TUN_1. For instance, both proxy and DNS traffic could be sent through the TUN_0, allowing the same VPN to analyze and modify both proxy traffic and DNS traffic.

In the illustrated embodiment, an application 810 sends its traffic to an address IP_0 or the proxy server specified in VPN settings provided to the application 810. This traffic is routed to VND 0 (TUN_0, 820). In some embodiments, application 815 is not enabled to use a proxy (for instance, VoIP application using UDP protocol). Its traffic is therefore routed to VND 1 (TUN_1, 830), which sends its traffic through VPN client 855 through a secure VPN tunnel to the VPN server 870. The VPN server 870 forwards the traffic, e.g., content requests, to one or more content providers 880. The content providers 880 return content in response to the content requests to the VPN server 870. The VPN server 870 then returns the content to the user's computer 835, where the content is routed to the proxied application by the VPN client 855 and VND 1 (TUN_1, 830).

Proxy traffic, such as from application 810, is shifted to the user space by TUN_0 and is received by a proxy traffic manager 840, which selects one of a plurality of processing choices depending on the parameters of the specific content request, such as one or more headers from the group of CONNECT, SNI, HOST, GET and User Agent headers. The processing choices and the manner in which they are selected may be according to the approaches described above with respect to FIGS. 6 and 7.

In some embodiments, one of these processing choices comprises terminating proxy traffic by a local proxy server 850, instead of sending proxy traffic to an external IP address IP_0 to which the proxy connection was addressed. Local proxy server 850 may be further instructed to either establish a direct connection 865 to a content provider 880 referenced by the proxy traffic or to send the proxy traffic through another VPN. In another example, local proxy 850 establishes a direct connection by using the "setsockopt" command to bind the new socket to an interface not associated with any VPN. The local proxy 850 may route traffic through another VPN by using the "setsockopt" command to bind a new socket to an interface associated with the second VPN (e.g., utun1). For example, the local proxy request may bind a new socket 825 to VND 830 and route traffic through VND 830 and VPN client 855 to the VPN server 870. The VPN server 870 may then request content referenced in the traffic from a content provider 880 referenced in the traffic, receive a requested content from the content provider 880, and return the requested content to the requesting application 810, such as by way of the VND 830, local, proxy server 850, proxy traffic manager 840, and VND 820.

In some embodiments, another processing choice includes sending the proxy traffic through the VPN tunnel established by the first VPN, from the VPN client 845 to the VPN server 860. For example, traffic manager 840 may change a proxy IP address from IP_0 to IP_1. The VPN server 860 then sends the traffic to the remote proxy server 875 referenced by IP_1, which establishes direct connections with content providers 880 referenced by the proxy traffic to retrieve content requested in the proxy traffic and return the retrieved content to the proxied application 810 that generated the proxy traffic, such as by way of the VPN 845, proxy traffic manager 840, and VND 0 (TUN_0, 820).

As a result, the embodiments disclosed herein may route the proxy traffic either in bypass of a remote proxy, or through a different remote proxy, or through one of the multiple VPNs. This is useful, for instance, when only one of the VPNs is allowed to inspect or modify the traffic on the user's computer.

For example, the first VPN may be on an iOS™ device, such as an iPhone™ developed by the Apple Inc., and may be a custom VPN extension that enables third-party software to inspect or modify traffic. The second VPN on the same iOS™ device may be a native VPN client provided by the operating system and that doesn't have access to traffic generated by third-party software.

In some embodiments, only the second VPN establishes a tunnel between its client 855 and the VPN server 870, while the first VPN sends all traffic not routed through VND 1 (TUN_1, 830) of the second VPN in bypass of any VPN tunnel.

In some embodiments, the first VPN and the second VPN use different VPN protocols to establish VPN tunnels. For example, the second VPN may use IPSEC (Internet Protocol Security) protocol to establish a VPN tunnel, while the first VPN uses a different protocol, for instance OpenVPN protocol published under the GNU General Public License (GPL).

One example use of the described embodiments is to enable client-side filtering and modification of the traffic sent through native IPSEC VPN client. IPSEC protocol is often used by enterprise VPNs. Multiple enterprises have installed IPSEC VPN servers on their premises. Enterprise VPN settings are often provided as profiles for the native IPSEC client, which limits the processing choices. The above-described embodiments may make it possible, for instance, to detect and block malware-related requests on the client's device, instead of sending them through the IPSEC VPN.

Another example use of the described embodiments is to limit the use of corporate VPN to access domains or IP addresses associated with specific corporate resources. For example, iOS™ operating system supports on-demand VPN rules, but, as soon as the matching domain is found, it sends all traffic through the VPN, instead of limiting it to selected domain.

Another example use of the described embodiments is to utilize different types of VPNs for protection of a user's private content and the user's access to corporate resources. Many enterprises allow their employees to bring their own device (BYOD): the same mobile phone is allowed to be used for both business and personal purposes. The embodiments disclosed herein may enable protection of both types of traffic without forcing the reconnection between corporate and personal VPNs: both VPNs can be active at the same time.

Figure 9:
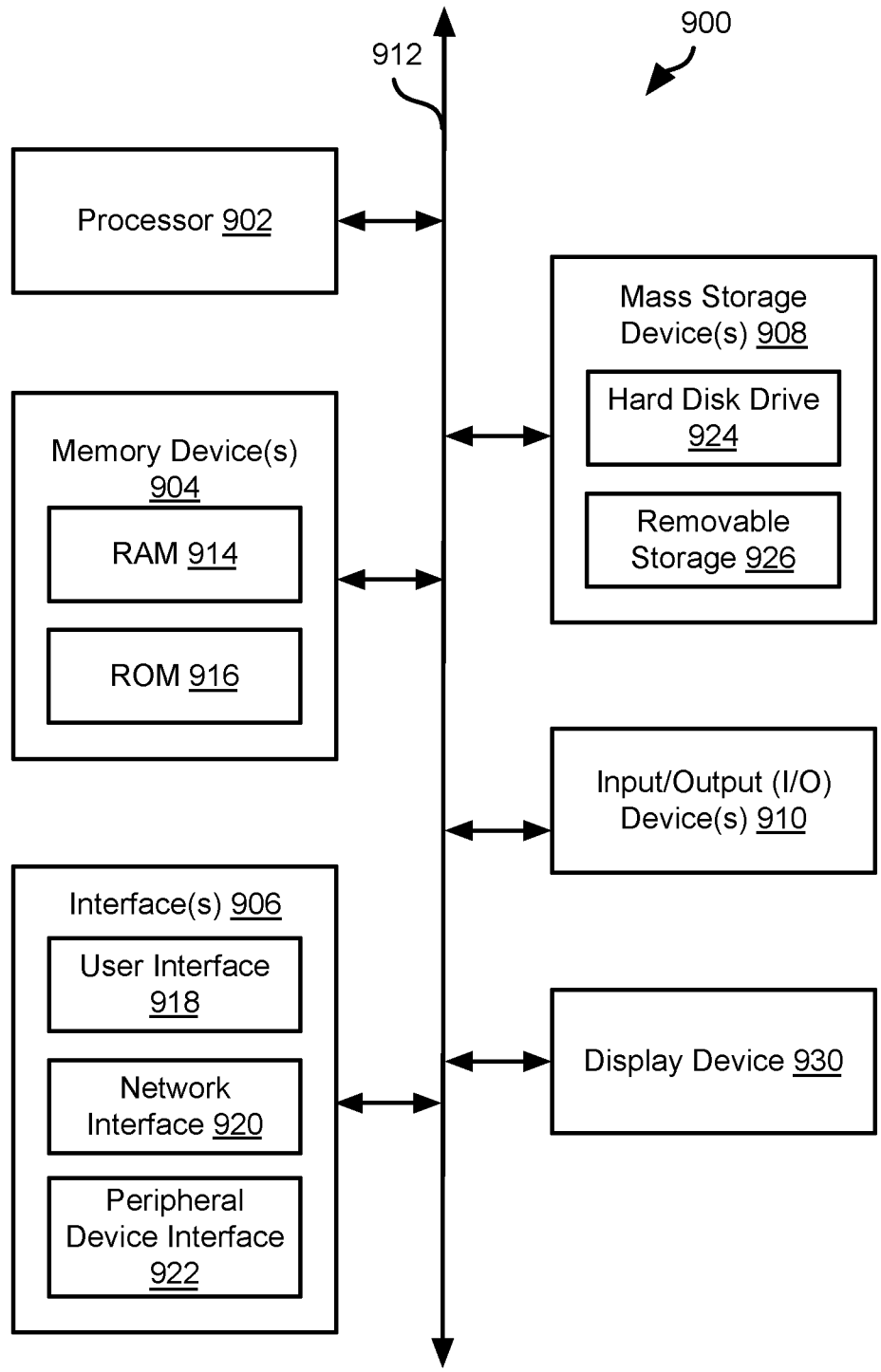
FIG. 9 is a schematic block diagram of a computing device that may be used to implement the systems and methods described herein.

Computing devices (user computer, proxy server, VPN server, content server, etc.), networking components, and modules described herein may have some or all of the attributes of the computing device 900 of FIG. 9. In particular, components described above as being a computer or a computing device may have some or all of the attributes of the computing device 900 of FIG. 9. FIG. 9 is a block diagram illustrating an example computing device 900 which can be used to implement the systems and methods disclosed herein Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, lenses, CCDs or other image capture devices, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, etc.), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method for processing proxy requests, the method comprising:
    receiving, by a first computing module executing on a user's computer from a second computing module on the user's computer, a first request for a proxy server to retrieve content from a content server in a first domain, the first request formatted as a request to the proxy server at a destination associated with a first identifier, the first identifier being a network identifier different from a network identifier of the user's computer;
    terminating the first request by a third computing module executing on the user's computer without sending the first request to a destination associated with the first identifier; and
    retrieving, by the third computing module, the content from the content server in the first domain in bypass of the proxy server referenced by the first identifier.

2. The method of claim 1, the method further comprising:
    obtaining, by the third computing module, a second identifier associated with the first domain name; and
    sending a second request from the user's computer to a destination associated with the second identifier without sending the second request to a destination associated with the first identifier.

3. The method as in claim 2, wherein obtaining the second identifier comprises issuing a Domain Name Service (DNS) request to resolve the first domain name.

4. The method of claim 3, wherein the DNS request is issued to an IP address different from an IP address of a DNS server used by one or more applications executed on the user's computer.

5. The method of claim 3, further comprising:
    receiving a response to the DNS request; and
    storing the response on the user's computer without updating a DNS cache used by the one or more applications executed on the user's computer.

6. The method of claim 1, where receiving the first request by the first computing module comprises receiving the first request from a virtual network device enabled to shift network traffic from a kernel space to a user space on the user's computer.

7. The method as in claim 1, where the third computing module is a local proxy server.

8. The method of claim 1, further comprising:
    before receiving the first request, specifying proxy setting on the user's computer, the proxy setting including the first identifier.

9. The method of claim 8, where the proxy setting is specified as a one of the settings of a virtual private network (VPN).

10. The method of claim 1, where the first identifier is an IP address.

11. A method for processing requests to a proxy server, the method comprising:
    receiving, by a first computing module on a user's computer from a second computing module on the user's computer, a first request requesting retrieval of content from a first domain by a first proxy server, the first request formatted as a request to the first proxy server at a destination associated with a first identifier, first identifier being a network identifier different from a network identifier of the user's computer;
    encrypting, on the user's computer, at least a portion of the received first request to obtain an encrypted portion; and
    sending the encrypted portion to a destination associated with a second identifier, second identifier being a network identifier different from the first identifier and from the network identifier of the user's computer without sending the encrypted portion to the destination associated with the first identifier.

12. The method of claim 11, wherein sending the encrypted portion to the destination associated with second identifier comprises redirecting the encrypted portion to a second proxy server associated with the second identifier.

13. The method of claim 11, wherein encrypting the at least the portion of the first request comprises encrypting one or more plaintext headers from the group consisting of CONNECT, HOST and User Agent headers.

14. The method of claim 11, wherein encrypting the at least the portion of the first request and sending it to the destination associated with the second identifier comprises sending the at least the portion inside an encrypted Virtual Private Network (VPN) tunnel from a VPN client on the user's computer to a VPN server associated with the second identifier.

15. The method of claim 14, where sending the at least portion of the first request to the destination associated with the second identifier comprises sending the first request to a second proxy server through a VPN tunnel of the VPN, the second proxy server being different from the first proxy server.

16. The method of claim 11, further comprising:
    before receiving the first request, specifying proxy setting on the user's computer, the proxy setting including the first identifier.

17. The method of claim 16, wherein the proxy settings are included in settings for a Virtual Private Network (VPN).

18. The method of claim 11, wherein receiving the first request by the first computing module comprises receiving data of the first request from a virtual network device, the virtual network device shifting the data of the first request from a kernel space to a user space, the first module also operating in the user space.

19. The method of claim 11, further comprising:
    in addition to receiving, on the user's computer, the first request formatted as a request to the first proxy server, receiving, on the user's computer, one or more additional requests formatted as requests to one or more content servers, the one or more additional requests being addressed to one or more third identifiers;

sending at least a portion of received traffic addressed to the first identifier as part of the first request to a remote proxy server associated with the second identifier;

sending at least a portion of one or more requests to the one or more content servers to a VPN server associated with a fourth identifier that is a network identifier different from the first identifier and the second identifier.

20. The method of claim 19, where the remote proxy server and the VPN server are located on a same computer that is different from the user's computer.

21. The method of claim 19, further comprising:

issuing, by the user's computer, one or more Domain Name Service (DNS) requests for domain names associated with the one or more third identifiers; and refraining from issuing, by the user's computer, any DNS requests for the traffic of the first request and addressed to the first identifier.

22. A method comprising:

specifying, on a user's computer, one or more Virtual Private Network (VPN) settings including a proxy setting instructing a VPN service to proxy VPN traffic through a remote proxy server;

executing a proxy interception module on the user's computer programmed to intercept network traffic routed according to the proxy setting to the remote proxy server;

activating the VPN service on the user's computer according to the one or more VPN settings;

intercepting, by the proxy interception module, network traffic addressed to the remote proxy server according to the one or more VPN settings, the network traffic including a request to a remote proxy server to retrieve content from a content server in a first domain;

sending, by the user's computer, the intercepted network traffic to a destination other than the remote proxy server included in the VPN settings, the destination including the content server;

refraining from sending the intercepted network traffic to the remote proxy server referenced in the VPN settings.

23. The method of claim 22, wherein the proxy setting includes a first network identifier and a destination port of the remote proxy server, the method further comprising:

providing at least one of the first network identifier and the destination port to the proxy interception module to enable interception of the intercepted network traffic; and intercepting, by the proxy interception module, the intercepted network traffic in response to detecting the at least one of the first network identifier and the destination port in the intercepted network traffic.

24. The method of claim 23, wherein the first network identifier is not associated with a computer enabled to function as a proxy server.

25. The method of claim 24, wherein the first network identifier is selected from the group consisting of a non-routable IP address, a reserved IP address, and a test IP address.

26. The method of claim 23, wherein the first network identifier is a domain name not associated with a DNS (Domain Name Service) record.

27. The method of claim 26, further comprising:

intercepting a DNS request to the domain name and returning an IP address to a source of the DNS request, the IP address being accessible by the proxy interception module on the user's computer before the DNS request was issued.

28. The method of claim 23, further comprising:

providing an IP address associated with the first network identifier as a configuration parameter in the proxy setting.

29. The method of claim 22, wherein intercepting the network traffic comprises receiving the traffic from a virtual network device programmed to shift the network traffic from a kernel space to a user space.

30. The method of claim 22, wherein sending intercepted network traffic to the destination other than the remote proxy server included in the VPN settings comprises sending the network traffic to a local proxy server on the user's computer.

* * * * *